United States Patent
Balasubramanian et al.

(10) Patent No.: US 10,779,355 B2
(45) Date of Patent: Sep. 15, 2020

(54) RESTRICTING BEARERS IN A CONNECTION

(71) Applicant: QUALCOMM Incorporated, San Diego, CA (US)

(72) Inventors: Srinivasan Balasubramanian, San Diego, CA (US); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/921,467

(22) Filed: Mar. 14, 2018

(65) Prior Publication Data
US 2018/0279409 A1    Sep. 27, 2018

Related U.S. Application Data

(60) Provisional application No. 62/476,593, filed on Mar. 24, 2017.

(51) Int. Cl.
| | |
|---|---|
| *H04W 76/28* | (2018.01) |
| *H04W 76/15* | (2018.01) |
| *H04W 72/14* | (2009.01) |
| *H04W 72/12* | (2009.01) |
| *H04W 76/12* | (2018.01) |
| *H04W 76/10* | (2018.01) |

(52) U.S. Cl.
CPC ....... *H04W 76/28* (2018.02); *H04W 72/1284* (2013.01); *H04W 72/14* (2013.01); *H04W 76/12* (2018.02); *H04W 76/15* (2018.02)

(58) Field of Classification Search
CPC ..... H04W 76/28; H04W 76/12; H04W 76/10; H04W 72/1824; H04W 72/14

USPC ......................................................... 370/329
See application file for complete search history.

(56) References Cited

U.S. PATENT DOCUMENTS

| | | | |
|---|---|---|---|
| 9,692,567 B1* | 6/2017 | Vaidya | H04L 5/0037 |
| 2015/0327032 A1* | 11/2015 | Hedman | H04W 4/70 370/329 |
| 2017/0094700 A1* | 3/2017 | Hong | H04W 76/12 |

FOREIGN PATENT DOCUMENTS

| | | |
|---|---|---|
| EP | 2940955 A1 | 11/2015 |
| WO | WO-2014206477 A1 | 12/2014 |

OTHER PUBLICATIONS

3GPP TS 36.321 V13.5.0 (Mar. 2017), "Medium Access Control (MAC) protocol specification" (Year: 2017).*
3GPP TS 23.401 V14.3.0 (Mar. 2017), "General Packet Radio Service (GPRS) enhancements for Evolved Universal Terrestrial Radio Access Network (E-UTRAN) access" (Year: 2017).*

(Continued)

*Primary Examiner* — Yemane Mesfin
*Assistant Examiner* — Intekhaab A Siddiquee
(74) *Attorney, Agent, or Firm* — Patterson+ Sheridan, L.L.P.

(57) ABSTRACT

Certain aspects of the present disclosure relate to methods and apparatus for restricting bearers in a connection. An exemplary method generally includes configuring one or more radio bearers for communicating with the network, determining that data associated with at least one radio bearer of the one or more radio bearers needs to be transmitted, selectively activating the at least one radio bearer based on the determination that the data associated with the at least one radio bearer needs to be transmitted, transmitting the data over the at least one activated radio bearer.

27 Claims, 9 Drawing Sheets

(56) References Cited

OTHER PUBLICATIONS

3GPP TS 36.323 V14.1.0 (Dec. 2016)."Packet Data Convergence Protocol (PDCP) specification" (Year: 2016).*
3GPP TS 36.213 V11.9.0 (Dec. 2014),"Physical layer procedures" (Year: 2014).*
3GPP TS 36.321 V13.5.0 (Mar. 2017), "Medium Access Control (MAC) protocol specification" (Year: 2017) (Year: 2017).*
3GPP TS 23.401 V14.3.0 (Mar. 2017), "General Packet Radio Service (GPRS) enhancements for Evolved Universal Terrestrial Radio Access Network (E-UTRAN) access" (Year: 2017) (Year: 2017).*
3GPP TS 36.323 V14.1.0 (Dec. 2016)."Packet Data Convergence Protocol (PDCP) specification" (Year: 2016) (Year: 2016).*
3GPP TS 36.213 V11.9.0 (Dec. 2014),"Physical layer procedures" (Year: 2014) (Year: 2014).*
3GPP TS 36.321 V13.5.0 (Mar. 2017-03), "Medium Access Control (MAC) protocol specification" (Year: 2017).*
3GPP TS 24.301 V14.3.0 (Mar. 2017), 3rd Generation Partnership Project; Technical Specification Group Core Network and Terminals; Non-Access-Stratum (NAS) protocol for Evolved Packet System (EPS); Stage 3 (Release 14) (Year: 2017).*
International Search Report and Written Opinion—PCT/US2018/022652—ISA/EPO—dated May 30, 2018.
CISCO: "Targeted Service Request," 3GPP Draft; S2-130761, Targeted Service Request V1.1, 3rd Generation Partnership Project (3GPP), Mobile Competence Centre; 650, Route Des Lucioles, F-06921, Sophia-Antipolls Cedex, France, vol. SA, WG2, San Diego, USA; Apr. 8, 2013-Apr. 12, 2013, Apr. 10, 2013 (Apr. 10, 2013), XP050708467, 9 pages, Retrieved from the Internet: URL: http://www.3gpp.org/ftp/tsg_sa/WG2_Arch/TSGS2_96_San_Diego/Docs/ [retrieved-on Apr. 10, 2013].

\* cited by examiner

RESTRICTING BEARERS IN A CONNECTION

CLAIM OF PRIORITY UNDER 35 U.S.C. § 119

This application claims benefit of U.S. Provisional Patent Application Ser. No. 62/476,593, filed Mar. 24, 2017, which is herein incorporated by reference in its entirety.

FIELD

The present disclosure relates generally to communication systems, and more particularly, to methods and apparatus for restricting bearers in a connection.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an e NodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure generally relate to methods and apparatus for restricting bearers in a connection.

Certain aspects of the present disclosure provide a method for communications by a user equipment (UE). The method generally includes configuring one or more radio bearers for communicating with the network, determining that data associated with at least one radio bearer of the one or more radio bearers needs to be transmitted, selectively activating the at least one radio bearer based on the determination that the data associated with the at least one radio bearer needs to be transmitted, and transmitting the data over the at least one activated radio bearer.

Certain aspects of the present disclosure provide an apparatus for communications by a user equipment (UE). The apparatus generally includes at least one processor configured to configure one or more radio bearers for communicating with the network, determine that data associated with at least one radio bearer of the one or more radio bearers needs to be transmitted, selectively activate the at least one radio bearer based on the determination that the data associated with the at least one radio bearer needs to be transmitted, and transmit the data over the at least one activated radio bearer.

Certain aspects of the present disclosure provide an apparatus for communications by a user equipment (UE). The apparatus generally includes means for configuring one or more radio bearers for communicating with the network, means for determining that data associated with at least one radio bearer of the one or more radio bearers needs to be transmitted, means for selectively activating the at least one radio bearer based on the determination that the data associated with the at least one radio bearer needs to be transmitted, and means for transmitting the data over the at least one activated radio bearer.

Certain aspects of the present disclosure provide a non-transitory computer readable medium for communications by a user equipment (UE). The non-transitory computer readable medium generally includes instructions that, when executed by at least one processor, configure the at least one processor to configure one or more radio bearers for communicating with the network, determine that data associated with at least one radio bearer of the one or more radio bearers needs to be transmitted, selectively activate the at least one radio bearer based on the determination that the data associated with the at least one radio bearer needs to be transmitted, and transmit the data over the at least one activated radio bearer.

Certain aspects of the present disclosure provide a method for wireless communications by a base station (BS). The method generally includes configuring one or more radio bearers at a user equipment (UE) for communication with the network, determining that data associated with at least one radio bearer of the one or more radio bearers needs to be transmitted, selectively activating the at least one radio bearer based on the determination that the data associated with the at least one radio bearer needs to be transmitted, and at least one of transmitting or receiving the data over the at least one activated radio bearer.

Certain aspects of the present disclosure provide an apparatus for communications by a user equipment (UE). The apparatus generally includes at least one processor configured to configure one or more radio bearers at a user equipment (UE) for communication with the network, determine that data associated with at least one radio bearer of the one or more radio bearers needs to be transmitted, selectively activate the at least one radio bearer based on the determination that the data associated with the at least one radio bearer needs to be transmitted, and at least one of transmit or receive the data over the at least one activated radio bearer.

Certain aspects of the present disclosure provide an apparatus for communications by a user equipment (UE). The apparatus generally includes means for configuring one or more radio bearers at a user equipment (UE) for communication with the network, means for determining that data associated with at least one radio bearer of the one or more radio bearers needs to be transmitted, means for selectively activating the at least one radio bearer based on the determination that the data associated with the at least one radio bearer needs to be transmitted, and at least one of means for transmitting or means for receiving the data over the at least one activated radio bearer.

Certain aspects of the present disclosure provide a non-transitory computer readable medium for communications by a user equipment (UE). The non-transitory computer readable medium generally includes instructions that, when executed by at least one processor, configure the at least one processor to configure one or more radio bearers at a user equipment (UE) for communication with the network, determine that data associated with at least one radio bearer of the one or more radio bearers needs to be transmitted, selectively activate the at least one radio bearer based on the determination that the data associated with the at least one radio bearer needs to be transmitted, and at least one of transmit or receive the data over the at least one activated radio bearer.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
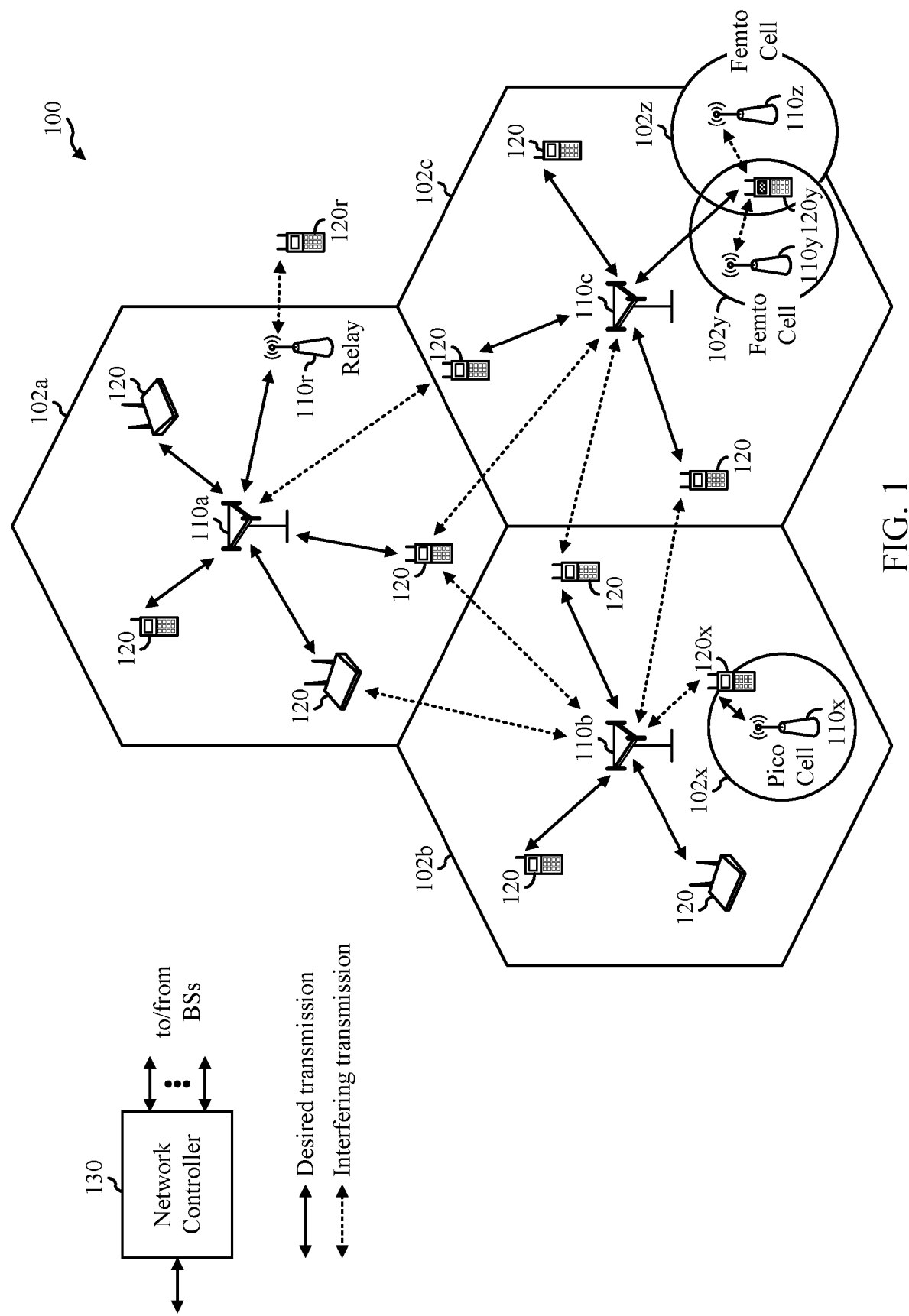
FIG. 1 is a block diagram conceptually illustrating an example telecommunications system, in accordance with certain aspects of the present disclosure.

Aspects of the present disclosure provide apparatus, methods, processing systems, and computer readable mediums for new radio (NR) (new radio access technology or 5G technology).

5G may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra reliable low latency communications (URLLC). These services may include latency and reliability requirements. These services may also have different transmission time intervals (TTI) to meet respective quality of service (QoS) requirements. In addition, these services may co-exist in the same subframe.

Aspects of the present disclosure relate restricting bearers in a connection. For example, aspects of the present disclosure propose techniques for selectively activating and deactivating bearers based on active traffic types. In some cases, when a bearer is deactivated, the bearer is deactivated without releasing context for that bearer.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100, such as a new radio (NR) or 5G network, in which aspects of the present disclosure may be performed, for example, for restricting bearers in a connection (e.g., selectively activating and deactivating bearers based on active traffic types), as described in greater detail below.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and eNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR.

NR may utilize OFDM with a CP on the uplink and downlink and include support for half-duplex operation using TDD. A single component carrier bandwidth of 100 MHz may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., gNB, 5G Node B, Node B, transmission reception point (TRP), access point (AP)) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
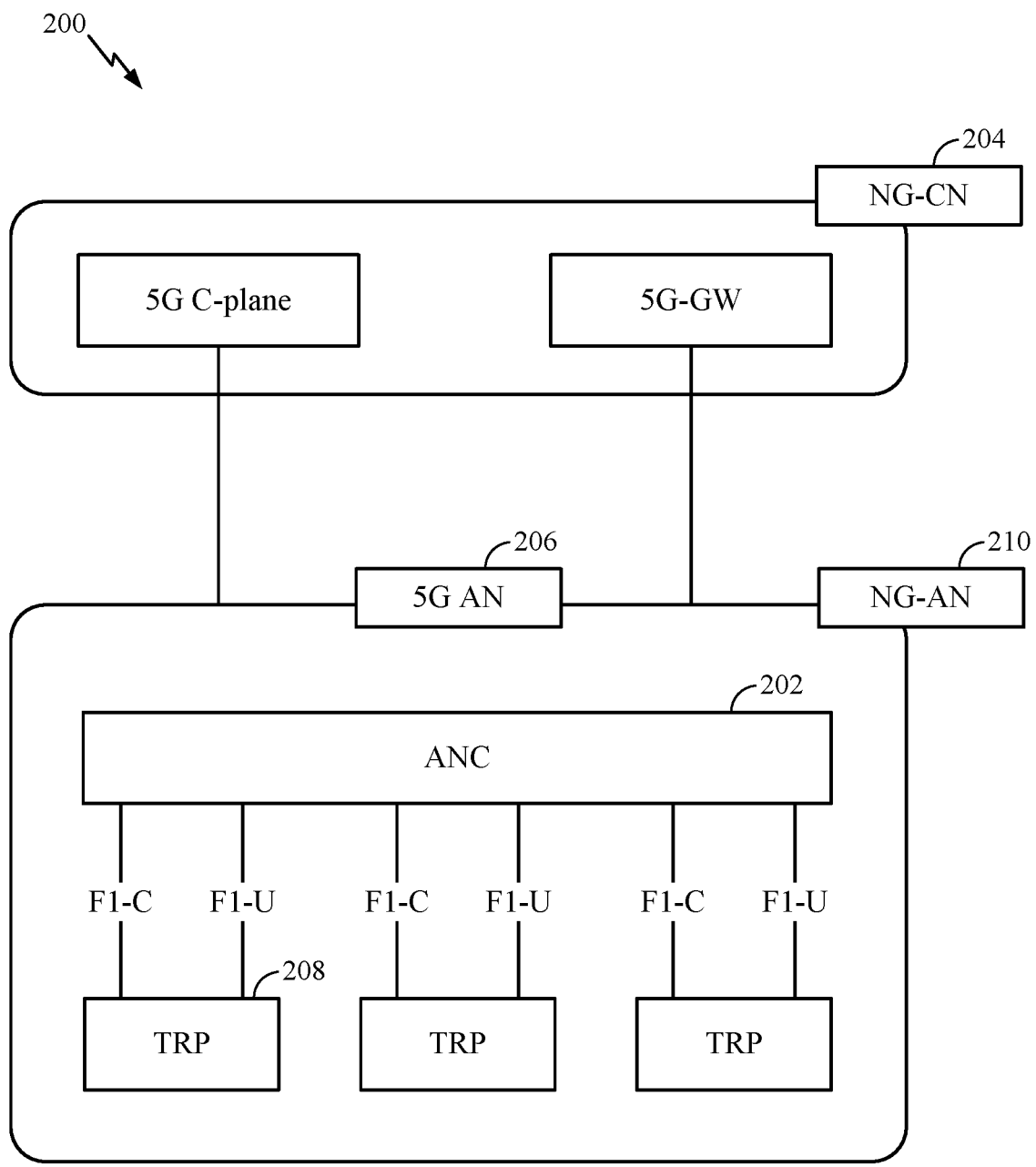
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
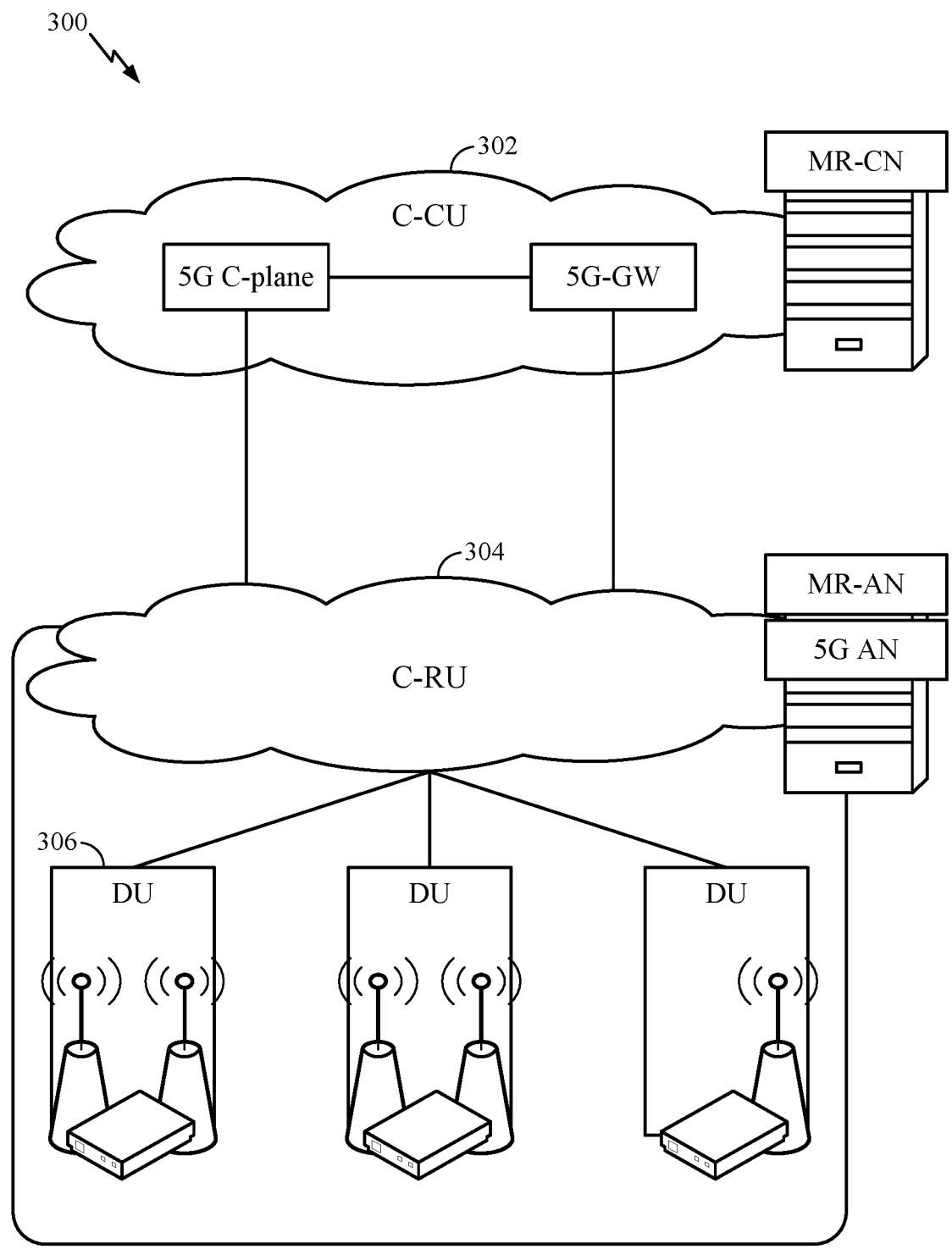
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
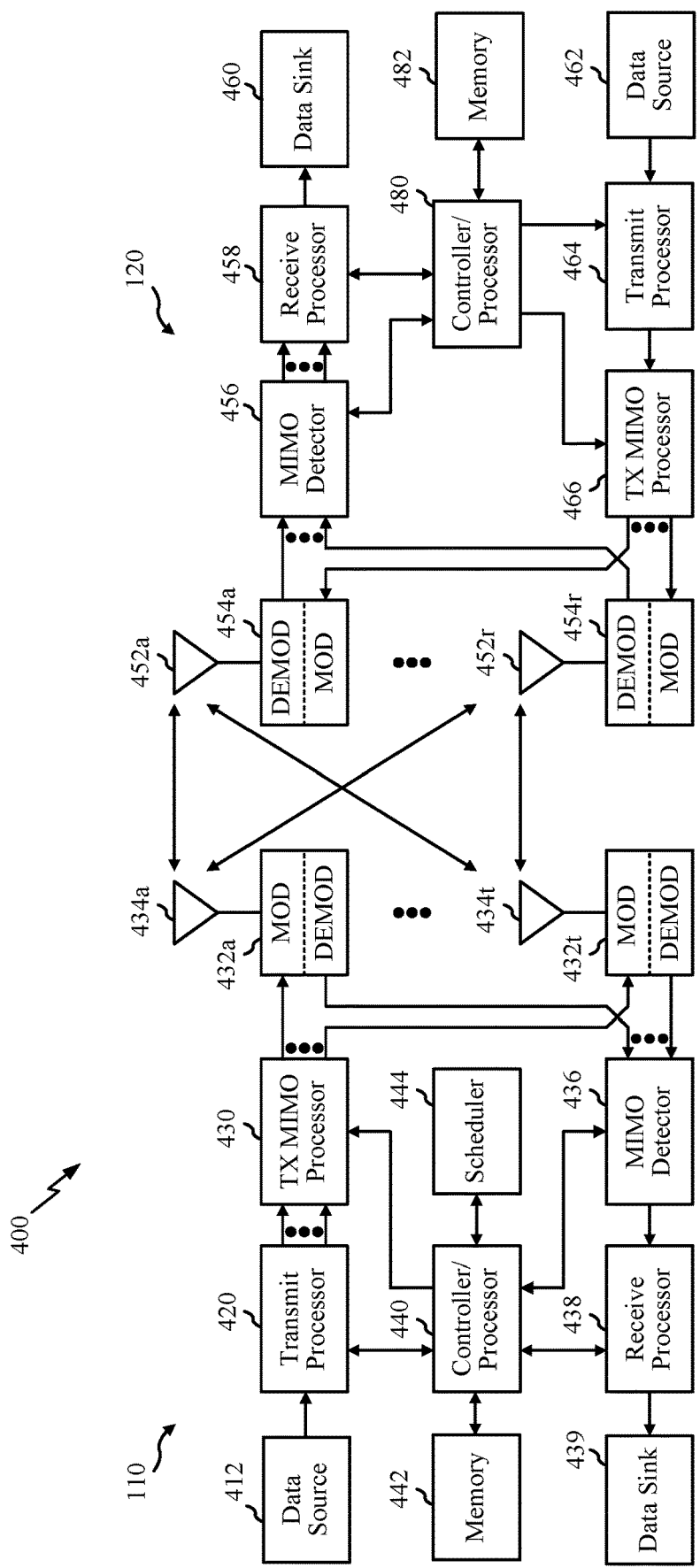
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. As described above, the BS may include a TRP. One or more components of the BS 110 and UE 120 may be used to practice aspects of the present disclosure. For example, antennas 452, Tx/Rx 222, processors 466, 458, 464, and/or controller/processor 480 of the UE 120 and/or antennas 434, processors 440, 420, 438, and/or controller/processor 440 of the BS 110 may be used to perform the operations described herein and illustrated with reference to FIGS. 8-9.

FIG. 4 shows a block diagram of a design of a BS 110 and a UE 120, which may be one of the BSs and one of the UEs in FIG. 1. For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DE-MODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, e.g., the execution of the functional blocks illustrated in FIG. 12, and/or other processes for the techniques described herein. The processor 480 and/or other processors and modules at the UE 120 may also perform or direct, e.g., the execution of the functional blocks illustrated in FIGS. 10 and 11, and/or other processes for the techniques described herein. The memories 442 and 482 may store data and program codes for the BS 110 and the UE 120, respectively. A scheduler 444 may schedule UEs for data transmission on the downlink and/or uplink.

Figure 5:
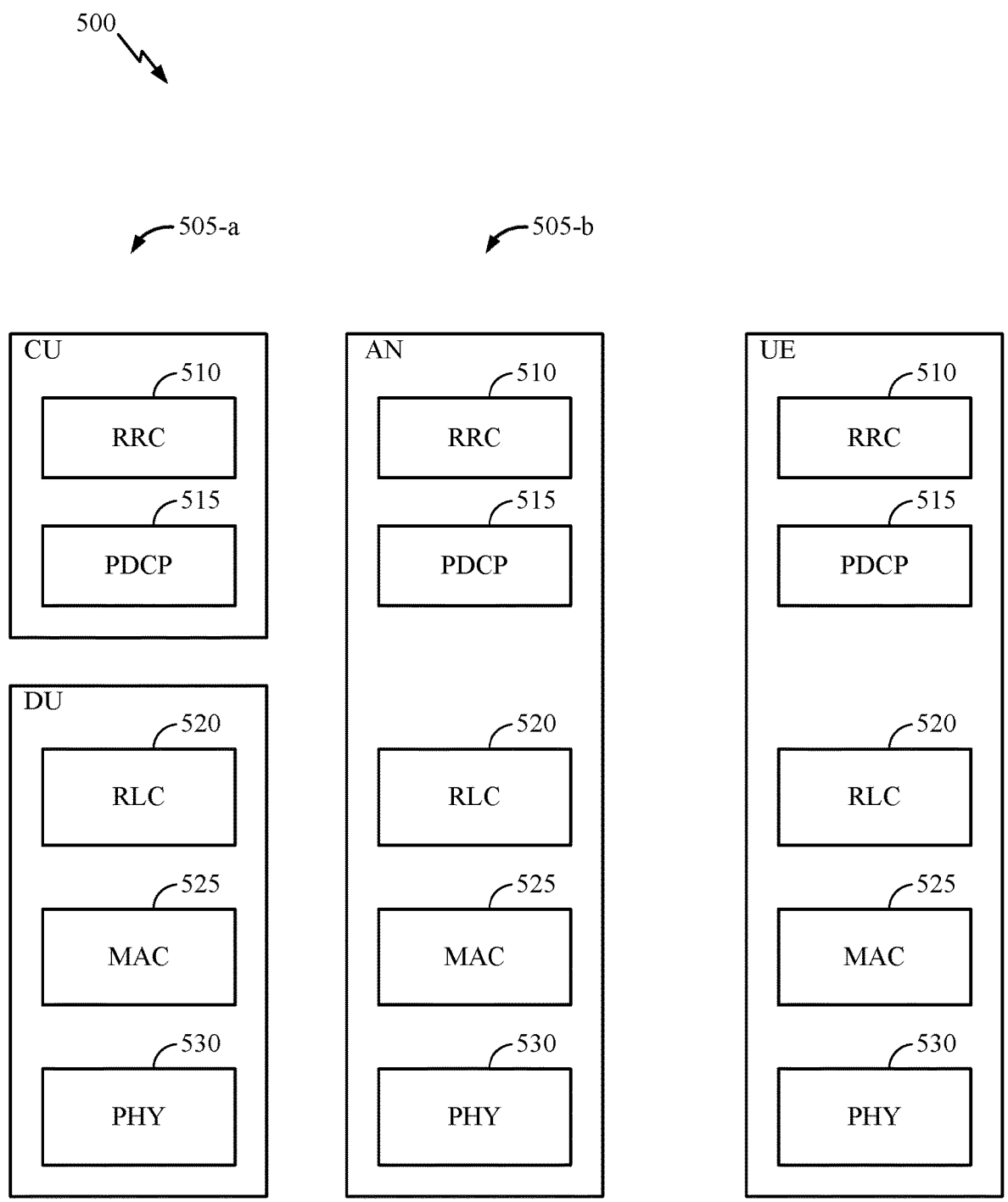
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU/TRP 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
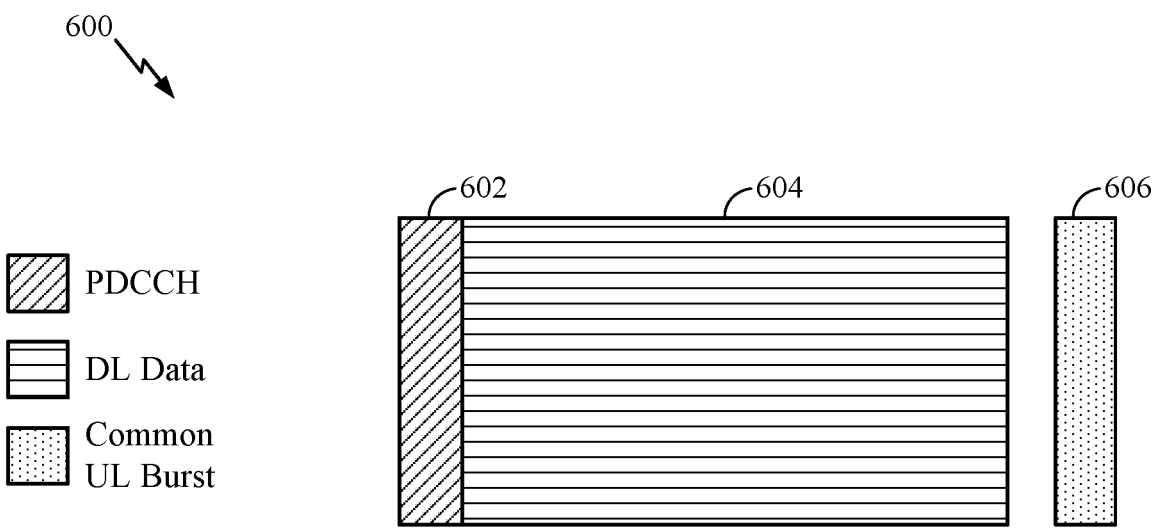
FIG. 6 illustrates an example of a DL-centric subframe, in accordance with certain aspects of the present disclosure.

FIG. 6 is a diagram 600 showing an example of a DL-centric subframe. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
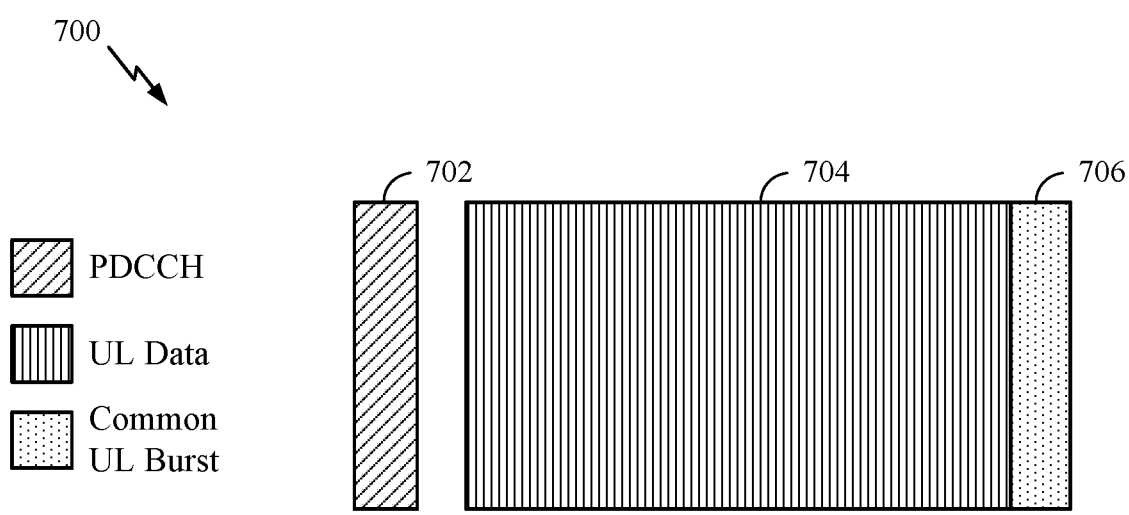
FIG. 7 illustrates an example of an UL-centric subframe, in accordance with certain aspects of the present disclosure.

FIG. 7 is a diagram 700 showing an example of an UL-centric subframe. The UL-centric subframe may include a control portion 702. The control portion 702 may exist in the initial or beginning portion of the UL-centric subframe. The control portion 702 in FIG. 7 may be similar to the control portion described above with reference to FIG. 6. The UL-centric subframe may also include an UL data portion 704. The UL data portion 704 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 702 may be a physical DL control channel (PDCCH).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 706. The common UL portion 706 in FIG. 7 may be similar to the common UL portion 706 described above with reference to FIG. 7. The common UL portion 706 may additional or alternative include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Restricting Bearers in a Connection

In LTE/NR, during an attachment procedure for establishing a radio connection between a user equipment (UE) and a base station (e.g., eNB/gNB), all internet protocol (IP) bearers and their associated radio bearers (collectively referenced as "bearers", herein) assigned to the UE are brought up/activated, independent of the fact whether a given specific bearer is used on the connection or not.

In some cases, the UE may be required to support a maximum set of bearers at a given time. If additional bearers are required, the UE may have to release certain bearers (e.g., releasing the context of these bearers) to accommodate the additional required bearers. If the released bearers are later needed by the UE, the UE will again have to bring up those prior-released bearers (e.g., by establishing context for these bearers), which wastes time and network resources.

Additionally, the eNB/gNB may not "know" the UE's intent for transmitting traffic on active traffic types (e.g., corresponding to the brought up bearers) that the UE wants to be engaged in real-time. This same issue exists in reverse as well with the UE not knowing the type of traffic expected on the DL from the eNB/gNB. Thus, the absence of knowledge of which type of traffic to expect at a given time prevents possible radio optimizations that can be achieved like per-bearer connected mode discontinuous reception (CDRX) parameter setting and the timely release of a radio connection. Thus, finer bearer classification based on traffic type, even within the best-effort Internet type traffic, will allow better radio level optimizations, such as advantageously setting CDRX parameters and release timers on a per-bearer basis, for example, to reduce the amount of resources spent when establishing or using a radio connection. In some cases, this may involve selectively activating and deactivating bearers (e.g., without releasing context) based on type of traffic needed to be transmitted.

Figure 8:
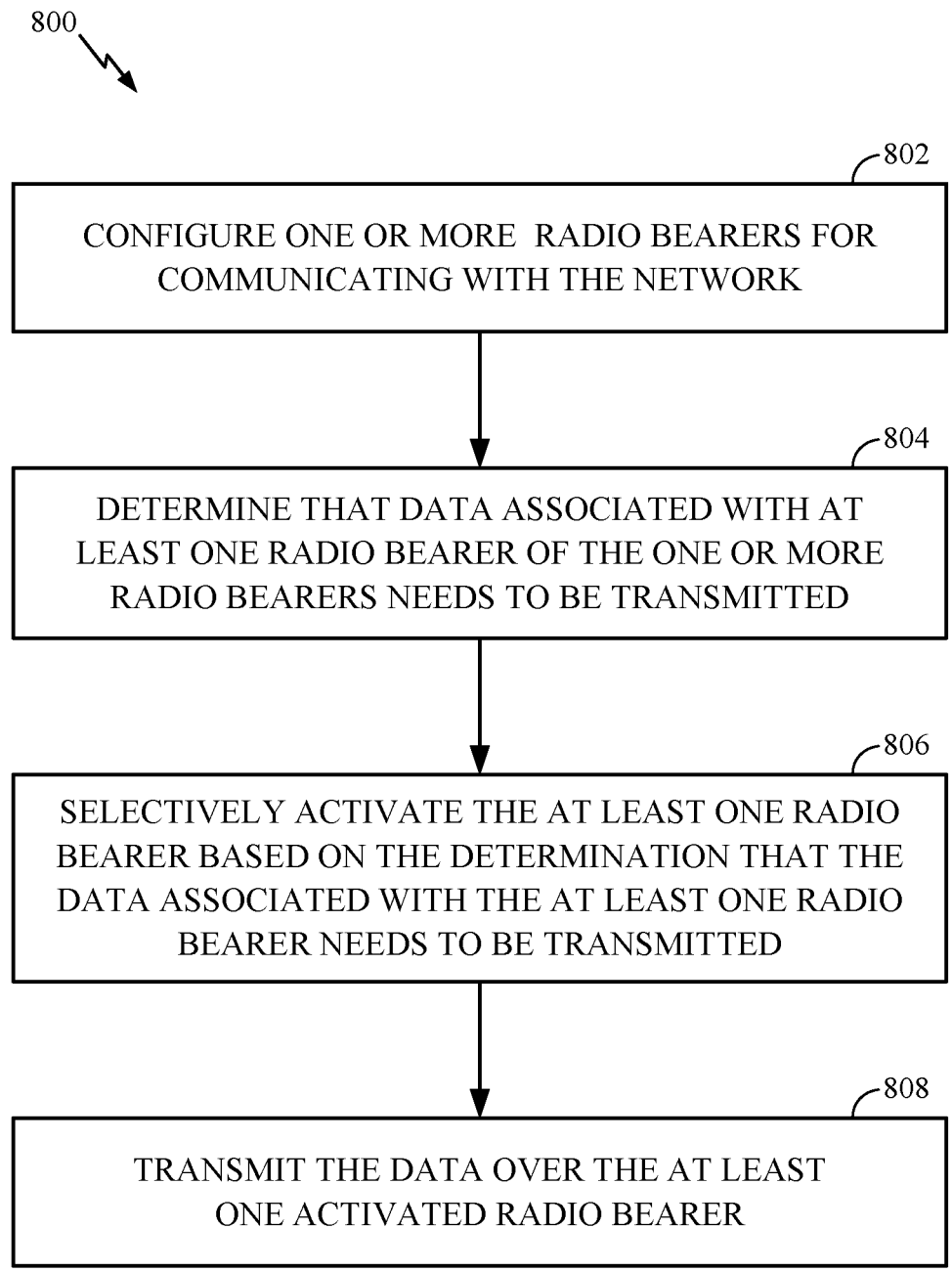
FIG. 8 illustrates example operations for wireless communications by a user equipment, in accordance with certain aspects of the present disclosure.

FIG. 8 illustrates example operations 800 for communications in a network (e.g., a wireless network), for example, for restricting the bearers needed to be brought up in a particular radio connection. According to certain aspects, operations 800 may be performed, for example, by a user equipment (e.g., UE 120).

According to aspects, the UE may include one or more components as illustrated in FIG. 4 which may be configured to perform the operations described herein. For example, the antenna 452, demodulator/modulator 454, controller/processor 480, and/or memory 482 as illustrated in FIG. 4 may perform the operations described herein.

Operations 800 begin at 802 by configuring one or more radio bearers for communicating with the network. At 804, the UE determines that data associated with at least one radio bearer of the one or more radio bearers needs to be transmitted. At 806, the UE selectively activates the at least one radio bearer based on the determination that the data associated with the at least one radio bearer needs to be transmitted. At 806, the UE transmits the data over the at least one activated radio bearer.

Figure 9:
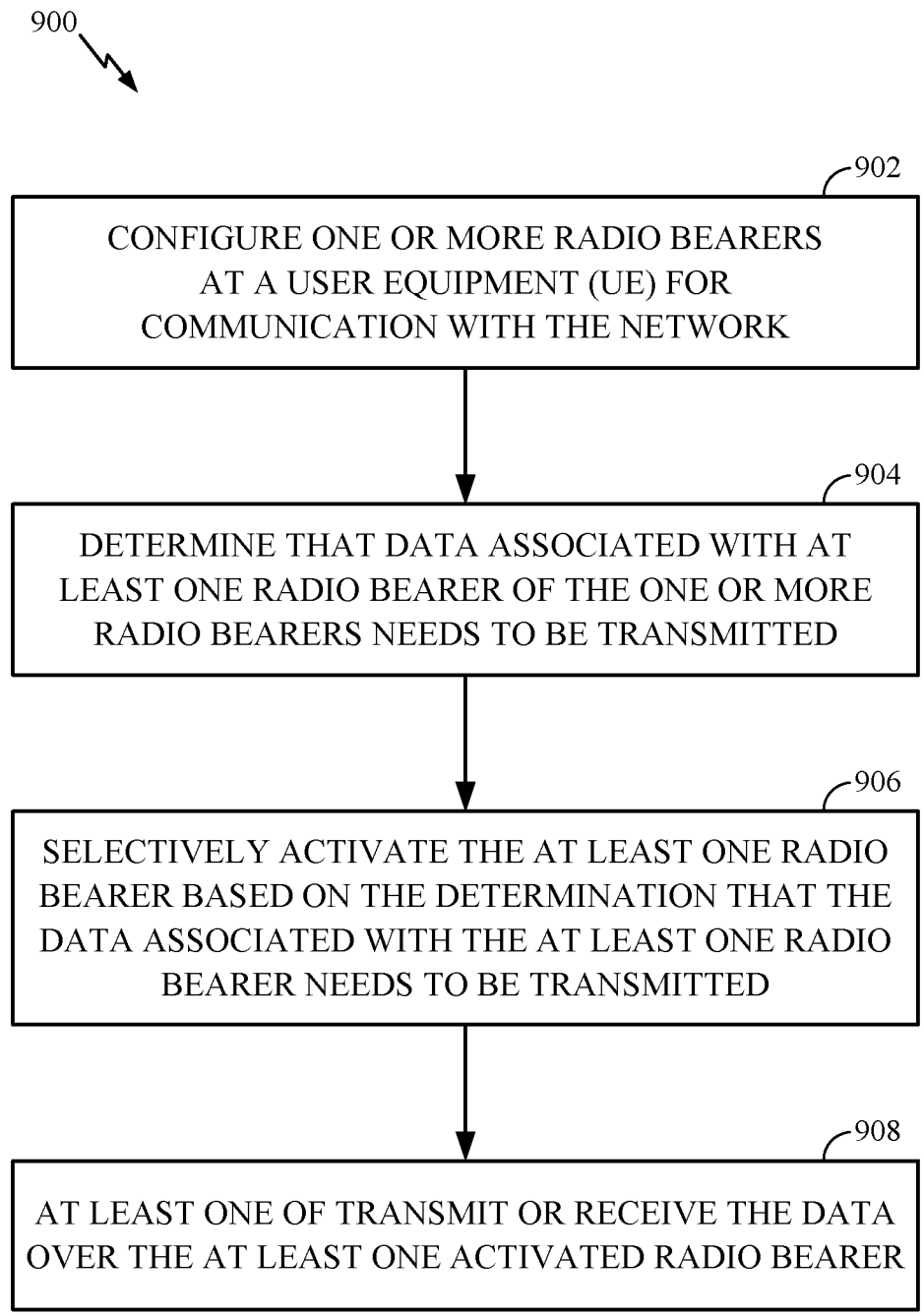
FIG. 9 illustrates example operations for wireless communications by a base station, in accordance with certain aspects of the present disclosure.

FIG. 9 illustrates example operations 900 for communications in a network (e.g., a wireless network), for example, for restricting the bearers needed to be brought up in a particular radio connection. According to certain aspects, operations 900 may be performed, for example, by a base station (e.g., BS 110).

According to aspects, the base station may include one or more components as illustrated in FIG. 4 which may be configured to perform the operations described herein. For example, the antenna 434, demodulator/modulator 432, controller/processor 440, and/or memory 442 as illustrated in FIG. 4 may perform the operations described herein.

Operations 900 begin at 902 by configuring one or more radio bearers at a user equipment (UE) for communication with the network. At 904, the BS determines that data associated with at least one radio bearer of the one or more radio bearers needs to be transmitted. At 906, the BS selectively activates the at least one radio bearer based on the determination that the data associated with the at least one radio bearer needs to be transmitted. At 908, the BS at least one of transmits or receives the data over the at least one activated radio bearer.

As noted, aspects of the present disclosure propose techniques to allow for setting CDRX parameters and connection release timers on a per-bearer basis to reflect the service type(s) (e.g., traffic types, for example, based on an Application ID/Flow ID) that are currently active. Thus, having the UE and eNB/gNB negotiate which of the configured bearers need to be brought up (i.e., activated) with RRC connection setup procedures will greatly aid with the process of selecting CDRX parameters and connection release timers.

According to aspects, CDRX timeline behaviour at the UE can be changed to allow for non-uniform time intervals (e.g., each radio bearer having its own CDRX parameters) that mimics the traffic type. For example, CDRX parameters may be set differently for each configured bearer such that a given bearer, corresponding to a particular traffic type, may go dormant. For example, a given bearer, corresponding to a particular traffic type may be deactivated, when the UE/eNB/gNB is finished transmitting/receiving that particular type of traffic. According to aspects, this bearer deactivation may advantageously be performed without releasing the context (e.g., QoS Flow context and/or PDU Session context) for the given bearer for a subsequent reactivation when needed.

For example, in some cases, a UE may determine that traffic of a first type needs to be transmitted. The UE may then selectively activate a radio bearer corresponding to the first type of traffic (e.g., based on a negotiation process with the base station). For example, the UE may transmit a request (e.g., a medium access control (MAC) control element, radio resource control (RRC) control signalling, etc.) to the base station indicating that the UE needs to send traffic of the first type over a radio bearer corresponding to the first type. The UE may then receive a response (e.g., another MAC control element, RRC control signalling, etc.) from the base station, instructing the UE to activate the radio bearer corresponding to the first type and to transmit the traffic. The UE may then transmit traffic/data over the activated radio bearer. According to aspects, once the UE is finished transmitting the traffic, the activated radio bearer may be deactivated, for example, according to certain parameters (e.g., CDRX parameters, radio bearer release timers, radio resource control (RRC) connection release timers, etc.). Further, as noted, a radio bearer may be deactivated without releasing context for that radio bearer. A detailed call flow illustrating this process may be seen in FIG. 10.

Figure 10:
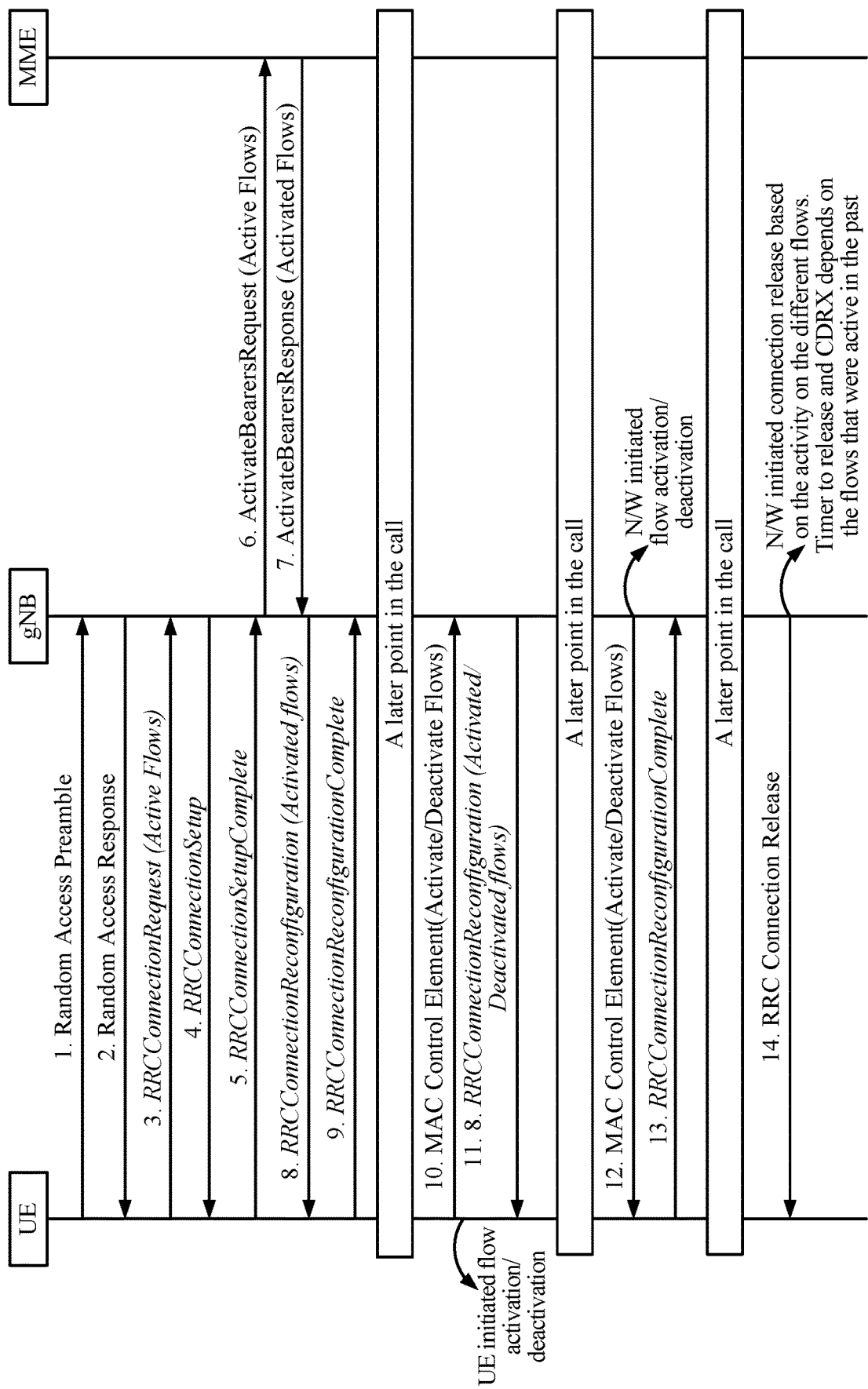
FIG. 10 is a call flow diagram illustrating selectively activating and deactivating bearers, in accordance with certain aspects of the present disclosure.

For example, as noted, FIG. 10 is a call flow illustrating the process of selectively activating and deactivating radio bearers, according to aspects presented herein.

For example, at step 1, the UE may initiate a random access procedure (e.g., by transmitting a random access preamble) to contact the network and request an RRC connection to be set up.

At step 2, the eNB/gNB may respond to the random access preamble transmitted by UE by transmitting a random access response.

At step 3, in response to the random access response, the UE may transmit an RRCConnectionRequest message to the eNB/gNB, indicating the traffic flow(s) that are currently active.

At step 4, the eNB/gNB may transmit an RRCConnectionSetup message to the UE, indicating the connection setup resources corresponding to the currently active traffic flow(s).

At step 5, the UE may acknowledge the RRCConnectionSetup message received from the eNB/gNB by transmitting an RRCConnectionSetupComplete message to the eNB/gNB.

At step 6, the eNB/gNB may provide information to the MME (in an Evolved Packet Core)/AMF (in a 5G core) indicating the traffic flow(s) that are currently active.

At step 7, in response to the information provided by the eNB/gNB, the MME responds by transmitting an ActivateBearersResponse message acknowledging the flows that are activated.

At step 8, the eNB/gNB transmits a message to the UE, indicating the flows that are activated. For example, as illustrated, at step 8, the eNB/gNB transmits an RRCConnectionReconfiguration message to the UE, indicating the flows that are activated.

At step 9, the UE transmits an acknowledgement (e.g., a RRCConnectionReconfigurationComplete message) to the eNB/gNB acknowledging that the flow have been activated.

At step 10, at a later in the call (e.g., when certain flows need to be activated/deactivated), the UE uses a media access control (MAC) control element (CE) to provide information to the network as the traffic condition changes to indicate which flows are activated/deactivated. For example, as illustrated, at step 10, the UE transmits a MAC CE to the eNB/gNB, indicating which flows are activated/deactivated.

At step 11, the eNB/gNB may transmit an indication (e.g., an RRCReconfiguration message) to the UE a new set of flows that remain activated, for example, corresponding to the flows indicated in the MAC CE transmitted by the UE. Additionally, while not illustrated, the eNB/gNB may transmit a message (e.g., similar to the message transmitted at step 9) informing the MME of the flows that are activated/deactivated (e.g., corresponding to the MAC CE transmitted by the UE). Additionally, while not illustrated, the UE may transmit an acknowledgement message in response to the RRCReconfiguration message.

According to aspects, in some cases, the network may initiate flow activation/deactivation. For example, as illustrated at step 12, the network (e.g., eNB/gNB) may transmit a MAC CE indicating to the UE specific flows that are being activated/deactivated. Additionally, while not illustrated, the eNB/gNB may transmit a message (e.g., similar to step 7) to the MME indicating the flows that are being activated/deactivated.

At step 13, the UE may transmit an RRCConnectionReconfigurationComplete message to the eNB/gNB acknowledging the specific flows that are being activated/deactivated. As noted above, deactivating a flow may be performed without losing context for a radio bearer associated with the deactivated flow.

According to aspects, at step 14, the network may initiate a connection release based on the activity of the different activated flows. For example, according to aspects, based on an inactivity timer and on the activity associated with an activated flow, the network may initiate a connection release and transmit and RRCConnectionRelease message to the UE, indicating the radio bearers (corresponding to the activated flows) that are being released. According to aspects, in some cases, the inactivity timer and CDRX parameters may depend on the flows that were active in the past.

In some cases, selectively activating a bearer may comprise transmitting a scheduling request for the bearer. For example, a UE may determine that the UE needs to transmit a first type of traffic, corresponding to a first radio bearer. The UE may transmit, to a serving base station, a scheduling request, requesting to transmit the first type of traffic on the first radio bearer. The UE may then receive signalling from the base station instructing the UE to activate the first bearer and indicating resources assigned to the UE (e.g., a resource grant) for transmitting the first type of traffic.

Further, in some cases, selectively activating a bearer may comprise receiving signalling from the network instructing the UE to activate the radio bearer. In response to the signalling, the UE may activate the bearer. Additionally, in some cases, this signalling received from the network may be received over a physical downlink control channel (PDCCH), and may comprise one of a specific indication to activate the at least one radio bearer or a scheduling grant for the at least one radio bearer.

According to certain aspects, selectively activating the bearer may comprise the UE transmitting a status report associated with the at least one radio bearer. According to aspects, the status report may comprise one of a Packet Data Convergence Protocol (PDCP) message or a radio link connection (RLC) activate bearer message. Additionally, in some cases, the status report may be transmitted by the UE on the bearer that is to be activated.

According to certain aspects, by allowing radio bearers to be deactivated without releasing context for those radio bearers allows for more individual traffic flows to be supported. According to aspects, deactivating radio bearers without releasing context becomes particularly useful when both ends (UE and eNB/gNB) are done with all the bearers, the radio connection can be immediately released. For example, currently when a voice over long term evolution (VoLTE)/voice over new radio (VoNR) call is finished, the UE may linger on the channel until the network releases these connections. This lingering on the channel by the UE is done to avoid additional signalling to bring UE back into a RRC connection again. According to aspects, when both ends (e.g., the UE and BS) know that there is no other activity ongoing on a radio connection (e.g., corresponding to a radio bearer), it becomes easier for the network to determine when the radio connection can be released and the radio bearer deactivated.

In some cases, as noted above, based on the active traffic types, the network may also employ different inactivity timer values to release a connection. According to aspects, this mechanism allows for the UE to report information to the eNB/gNB regarding current user actions without having to communicate too many details. For example, internet bursts can happen after a finite duration and the tradeoff of keeping the UE in connected state and wasting radio resources and comparing that to the load caused on the system of releasing and reestablishing the connection. In some cases, the network may tend to wait for 10 secs of inactivity for internet traffic before the connection is released. For VoLTE, when the dedicated QoS bearer is removed, the call may ne done and the radio connection can be released without waiting for an inactivity timer.

According to certain aspects, a type of QoS that can be provided with the best-effort flow may depend on the traffic type, which allows the eNB/gNB to better gauge the QoS guarantees that it needs provide the UE. According to aspects, classification of the types of flows can be specified in the standards. While the core network provides the grade of service to be provided to the user on best-effort (e.g., gold/silver/bronze levels) (e.g., based on a standard), the eNB/gNB can go finer in the real-time operation and provide a more appropriate QoS based on the experienced traffic type(s).

Further, in some cases, the UE may receive at least one of a quality of service (QoS) or a grade of service (GoS) assignment for the at least one radio bearer, wherein the QoS and GoS assignments comprise an indication of at least one of a guaranteed bit-rate for downlink traffic and uplink traffic over the at least one activated radio bearer. In some cases, the UE may receive an indication of a delay for downlink traffic and uplink traffic over the at least one activated radio bearer. In some cases, the UE may receive an indication of a peak error rate (PER) over downlink and uplink for the at least one activated radio bearer.

According to aspects, equipped with additional information (e.g., Service type, throughput/delay requirements, traffic bursty-ness patterns, Grade-of-Service expectation, etc.) from the UE, the eNB/gNB is able to assess the bit rate that is required for the flow, and, based on the current congestion, the bitrate that can be provided can be determined by the base station. With the newly added feature where the eNB/gNB can provide the instantaneous bitrate for a given bearer, a good understanding of the ongoing traffic types may provide a good estimate on the throughput guarantees that can be provided to the UE. This allows for the UE to better assess what to expect in terms of the experience on the current network. In some cases, assessing the bitrate for a given bearer may require the UE and eNB/gNB to reactivate a bearer that has been deactivated which can cause a slight increased delay. Assuming this is the start of the activation procedure (e.g., to activate specific radio bearers), the activation can be done through MAC control elements and/or RRC signalling (e.g., if the flow information changes are long ranging, such as VoIP call start/stop). This procedure (e.g., activation/deactivation of a traffic flow using the information exchanged between the UE and eNB/gNB along with the associated parameters) may be performed from both the UE and eNB/gNB. With the use of MAC control elements, the activation process can be brought down the minimum.

In some cases, the aspects presented above may also be applied to dual connectivity (DC). For example, in DC with a master control group (MCG) and slave control group (SCG) (MCG+SCG={LTE+NR or NR(Sub-6)+NR (mm-Wave)}), radio bearers associated with certain IP bearers can be configured and retained in a deactivated state when the UE is in RRC connection. According to aspects, with DC, the radio bearer itself can be pointing to (1) MCG, (2) SCG, or (3) both MCG&SCG (split bearer). With each of these configurations, MAC control elements transmitted by the base station can be used to activate/deactivate the bearer at the UE, for example, as noted above. In particular, with the option 3 (e.g., MCG&SCG) and the split bearer pointing to both MCG & SCG, MAC control element can be used to activate only one of the radio bearers (MCG or SCG) or both (MCG & SCG).

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for transmitting and/or means for receiving may comprise one or more of a transmit processor 420, a TX MIMO processor 430, a receive processor 438, or antenna(s) 434 of the base station 110 and/or the transmit processor 464, a TX MIMO processor 466, a receive processor 458, or antenna(s) 452 of the user equipment 120. Additionally, means for determining, means for configuring, means for selectively activating, and/or means for deactivating may comprise one or more processors, such as the controller/processor 440 of the base station 110 and/or the controller/processor 480 of the user equipment 120.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for perform the operations described herein and illustrated in FIGS. 8-9.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of communications by a user equipment (UE) in a network, comprising:
configuring one or more radio bearers for communicating with the network;
determining that data associated with at least one radio bearer of the one or more radio bearers needs to be transmitted;
selectively activating the at least one radio bearer based on the determination that the data associated with the at least one radio bearer needs to be transmitted by transmitting signaling in a media access control control element (MAC CE) to the network indicating a request to activate the at least one radio bearer;
transmitting the data over the at least one activated radio bearer; and
deactivating the at least one selectively activated radio bearer based on a plurality of parameters, wherein deactivating the at least one activated radio bearer is performed without releasing context for the at least one activated radio bearer once deactivated.

2. The method of claim 1, wherein selectively activating the at least one radio bearer comprises only activating those radio bearers that have data needing to be transmitted.

3. The method of claim 1, wherein the plurality of parameters include at least connected mode DRX (CDRX) parameters, a radio bearer release timer, and a radio resource control (RRC) Connection Release timer.

4. The method of claim 3, wherein the CDRX parameters, radio bearer release timer, and radio bearer and RRC connection release timer are different for different radio bearers.

5. The method of claim 1, wherein determining that data associated with the at least one radio bearer needs to be transmitted is based on signaling received from the network.

6. The method of claim 1, wherein selectively activating the at least one radio bearer further comprises receiving a confirmation from the network allowing the at least one radio bearer to be activated.

7. The method of claim 1, wherein the selectively activating the at least one radio bearer comprises:
transmitting a status report associated with the at least one radio bearer, wherein the status report comprises one of a Packet Data Convergence Protocol (PDCP) message or a radio link connection (RLC) activate bearer message.

8. The method of claim 7, wherein the status report is transmitted on the at least one radio bearer.

9. The method of claim 1, further comprising receiving at least one of a quality of service (QoS) or a grade of service (GoS) assignment for the at least one radio bearer, wherein the QoS and GoS assignments comprise an indication of at least one of a guaranteed bit-rate for downlink traffic and uplink traffic over the at least one activated radio bearer, a delay for downlink traffic and uplink traffic over the at least one activated radio bearer, or a peak error rate (PER) over downlink and uplink for the at least one activated radio bearer.

10. The method of claim 1, wherein selectively activating the at least one bearer and deactivating the at least one selectively activated radio bearer are based on a quality of service (QoS) or service associated with the data to be transmitted.

11. The method of claim 1, wherein:
the plurality of parameters for deactivating the at least one selectively activated radio bearer depends on a type of the data to be transmitted and a bandwidth associated with the type of data to be transmitted; and
the plurality of parameters are different for different types of data.

12. The method of claim 11, wherein the different types of data comprise one or more of enhanced mobile broadband (eMBB), millimeter wave (mmW), massive MTC (mMTC), or ultra-reliable low latency communications (URLLC).

13. A method of communications by a base station (BS) in a network, comprising:
configuring one or more radio bearers at a user equipment (UE) for communication with the network;
determining that data associated with at least one radio bearer of the one or more radio bearers needs to be transmitted;
selectively activating the at least one radio bearer based on the determination that the data associated with the at least one radio bearer needs to be transmitted by receiving signaling in a media access control control element (MAC CE) from the UE indicating a request to activate the at least one radio bearer;
at least one of transmitting or receiving the data over the at least one activated radio bearer; and
deactivating the at least one selectively activated radio bearer based on a plurality of parameters, wherein deactivating the at least one activated radio bearer is performed without releasing context for the at least one activated radio bearer once deactivated.

14. The method of claim 13, wherein selectively activating the at least one radio bearer comprises only activating those radio bearers that have data needing to be transmitted.

15. The method of claim 13, wherein the plurality of parameters include at least connected mode DRX (CDRX) parameters, a radio bearer release timer, and a radio resource control (RRC) Connection Release timer.

16. The method of claim 15, wherein the CDRX parameters, radio bearer release timer, and RRC connection release timer are different for different radio bearers.

17. The method of claim 13, further comprising transmitting information to the UE indicating the plurality of parameters.

18. The method of claim 13, wherein determining that data associated with the at least one radio bearer needs to be transmitted is based on signaling received from the UE.

19. The method of claim 13, wherein selectively activating the at least one radio bearer further comprises transmitting a confirmation to the UE allowing the at least one radio bearer to be activated.

20. The method of claim 13, wherein the selectively activating the at least one radio bearer comprises:
receiving a status report associated with the at least one radio bearer, wherein the status report comprises one of a Packet Data Convergence Protocol (PDCP) message or a radio link connection (RLC) activate bearer message.

21. The method of claim 20, wherein the status report is received on the at least one radio bearer.

22. The method of claim 13, wherein:
determining that data associated with the at least one radio bearer needs to be transmitted comprises transmitting information to the UE informing the UE when to receive the data associated with the at least one radio bearer; and
selectively activating the at least one radio bearer comprises, transmitting signaling to the UE, instructing the UE to activate the at least one radio bearer.

23. The method of claim 22, wherein the signaling comprises media access control (MAC) element.

24. The method of claim 13, further comprising determining at least one of a quality of service (QoS) or a grade of service (GoS) assignment for the at least one activated radio bearer, wherein the QoS and GoS assignments comprise an indication of at least one of a guaranteed bit-rate for downlink traffic and uplink traffic over the at least one activated radio bearer, a delay for downlink traffic and uplink traffic over the at least one activated radio bearer, or a peak error rate (PER) over downlink and uplink for at least one activated radio bearer.

25. The method of claim 24, further comprising transmitting the QoS or GoS assignment to the UE.

26. An apparatus for communications in a network, comprising:
at least one processor configured to:
configure one or more radio bearers for communicating with the network;
determine that data associated with at least one radio bearer of the one or more radio bearers needs to be transmitted;
selectively activate the at least one radio bearer based on the determination that the data associated with the at least one radio bearer needs to be transmitted by transmitting signaling in a media access control control element (MAC CE) to the network indicating a request to activate the at least one radio bearer, wherein:
transmit the data over the at least one activated radio bearer; and
deactivate the at least one selectively activated radio bearer based on a plurality of parameters, wherein deactivating the at least one activated radio bearer is performed without releasing context for the at least one activated radio bearer once deactivated; and
a memory coupled with the at least one processor.

27. An apparatus for communications in a network, comprising:
at least one processor configured to:
configure one or more radio bearers at a user equipment (UE) for communication with the network;
determine that data associated with at least one radio bearer of the one or more radio bearers needs to be transmitted;
selectively activate the at least one radio bearer based on the determination that the data associated with the at least one radio bearer needs to be transmitted by receiving signaling in a media access control control element (MAC CE) from the UE indicating a request to activate the at least one radio bearer;
at least one of transmit or receive the data over the at least one activated radio bearer; and
deactivate the at least one selectively activated radio bearer based on a plurality of parameters, wherein deactivating the at least one activated radio bearer is performed without releasing context for the at least one activated radio bearer once deactivated; and
a memory coupled with the at least one processor.

* * * * *